(12) United States Patent
Clarke

(10) Patent No.: US 8,607,242 B2
(45) Date of Patent: Dec. 10, 2013

(54) SELECTING CLOUD SERVICE PROVIDERS TO PERFORM DATA PROCESSING JOBS BASED ON A PLAN FOR A CLOUD PIPELINE INCLUDING PROCESSING STAGES

(75) Inventor: Michael P. Clarke, Ellenbrook, WA (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/874,792

(22) Filed: Sep. 2, 2010

(65) Prior Publication Data

US 2012/0060165 A1 Mar. 8, 2012

(51) Int. Cl.
*G06F 9/46* (2006.01)
*G06F 15/173* (2006.01)

(52) U.S. Cl.
USPC ............ 718/104; 718/102; 718/106; 709/226

(58) Field of Classification Search
None
See application file for complete search history.

(56) References Cited

U.S. PATENT DOCUMENTS

| | | | | |
|---|---|---|---|---|
| 7,987,262 | B2 * | 7/2011 | Tung et al. | 709/224 |
| 2003/0105810 | A1 | 6/2003 | McCrory et al. | |
| 2008/0080396 | A1 | 4/2008 | Meijer et al. | |
| 2009/0228967 | A1 | 9/2009 | Gbadegesin et al. | |
| 2009/0248693 | A1 | 10/2009 | Sagar et al. | |
| 2009/0276771 | A1 | 11/2009 | Nickolov et al. | |
| 2010/0061250 | A1 * | 3/2010 | Nugent | 370/242 |
| 2010/0131624 | A1 * | 5/2010 | Ferris | 709/221 |
| 2010/0332262 | A1 * | 12/2010 | Horvitz et al. | 705/4 |
| 2011/0016214 | A1 * | 1/2011 | Jackson | 709/226 |
| 2011/0131335 | A1 * | 6/2011 | Spaltro et al. | 709/228 |
| 2011/0238515 | A1 * | 9/2011 | Diwakar | 705/26.1 |

OTHER PUBLICATIONS

"Application-Specific Optimization via Server Push I/O Architecture", *Scalable Computing Software Laboratory* cs.iit.edu/~scs/research/projects.html (Obtained from the internet on Dec. 17, 2009) Nov. 2, 2009, 4 pages.

Dikaiakos, Marios D. et al., "Cloud Computing, Distributed Internet Computing for IT and Scientific Research", ieeexplore.ieee.org/Xplore/login.jsp?url=http%3A%2F%2Fieeexplore.ieee.org%2Fstamp%2Fstamp.jsp%3Ftp%3D%26arnumber%3D5233607%26isnumber%3D5233600&authDecision=-203 (Obtained from the internet on Dec. 17, 2009) Sep./Oct. 2009, pp. 10-13.

Lawton, Kevin, "Cloud Pipeline: future of inter cloud provider sneaker-nets", trendcaller.com/2009/08/cloud-pipeline-and-marketplace-future.html (Obtained from the internet on Apr. 1, 2010) Aug. 15, 2009, 3 pages.

(Continued)

*Primary Examiner* — Abdullah Al Kawsar
*Assistant Examiner* — Tammy Lee
(74) *Attorney, Agent, or Firm* — DeLizio Gilliam, PLLC

(57) ABSTRACT

Cloud service providers are selected to perform a data processing job based on information about the cloud service providers and criteria of the job. A plan for a cloud pipeline for performing the job is designed based on the information about the cloud service providers. The plan comprises processing stages each of which indicates processing upon a subset of a data set of the job. Allocated resources of the set of cloud service providers are mapped to the processing stages. Instructions and software images based on the plan are generated. The instructions and the software images implement the cloud pipeline for performing the data processing job. The instructions and the software images are transmitted to machines of the cloud service providers. The machines and the performing of the job are monitored. If the monitoring detects a failure, then the cloud pipeline is adapted to the failure.

22 Claims, 5 Drawing Sheets

(56) References Cited

OTHER PUBLICATIONS

Malik, Asad W. et al., "Optimistic Synchronization of parallel Simulations in Cloud Computing Environments", 2009 IEEE International Conference on Cloud Computing computer.org/portal/web/csdl/doi/10.1109/CLOUD.2009.79 (Obtained from the Internet on Dec. 17, 2009) 2009, pp. 49-56.

* cited by examiner

United States Patent US 8,607,242 B2

SELECTING CLOUD SERVICE PROVIDERS TO PERFORM DATA PROCESSING JOBS BASED ON A PLAN FOR A CLOUD PIPELINE INCLUDING PROCESSING STAGES

BACKGROUND

Embodiments of the inventive subject matter generally relate to the field of cloud computing, and, more particularly, to deploying a resource intensive data processing job over a number of resources allocated from a cloud.

In certain industries, a customer has a large amount of data (e.g., several terabytes) that require processing that can span several days. Examples of the data can be genetic sequencing for biotechnology research, geological data for mineral/petroleum exploration, and current and historical weather patterns for environmental research. The customer typically possesses the data at one location, while the processing resources (e.g., a grid and processing applications) are at a different location. The massive amount of data is typically sent to the processing location by shipping storage devices to the processing location. After the processing has completed, the results are then shipped to a customer location.

SUMMARY

Embodiments include a method comprising selecting a set of one or more cloud service providers to perform a data processing job based on information about the set of one or more cloud service providers and criteria of the data processing job. A plan for a cloud pipeline for performing the data processing job is designed based, at least in part, on the information about the set of one or more cloud service providers. The plan comprises a set of one or more processing stages each of which indicates processing upon a subset of a data set of the data processing job. Allocated resources of the set of one or more cloud service providers are mapped to the set of processing stages. Instructions and software images based, at least in part, on the plan are generated. The instructions and the software images implement the cloud pipeline for performing the data processing job. The instructions and the software images are transmitted to machines of the set of one or more cloud service providers. The allocated resources comprise the machines. The machines and the performing of the data processing job are monitored. If the monitoring detects a failure, then the cloud pipeline is adapted to the failure.

Embodiments also include a computer program product for establishing a cloud pipeline for a data processing job. The computer program product comprises a computer readable storage medium having computer readable program code embodied therewith. The computer readable program code comprises computer readable program code. The computer readable program code is configured to design a plan for a cloud pipeline for performing the data processing job based, at least in part, on cloud service provider data about a set of one or more cloud service providers. The plan comprises a set of one or more processing stages, each of which indicates processing upon a subset of a data set of the data processing job. Computer readable program code is also configured to map allocated resources of the set of one or more cloud service providers to the plurality of processing stages. Computer readable program code is configured to generate instructions and software images based, at least in part, on the plan. The instructions and the software images implement the cloud pipeline for performing the data processing job. Computer readable program code is configured to transmit the instructions and the software images to machines of the set of one or more cloud service providers. The allocated resources comprise the machines. Computer readable program code is configured to monitor the machines and the data processing job. Computer readable program code is configured to adapt the cloud pipeline to a failure if the computer readable program code configured to monitor the machines and the data processing job detects a failure.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
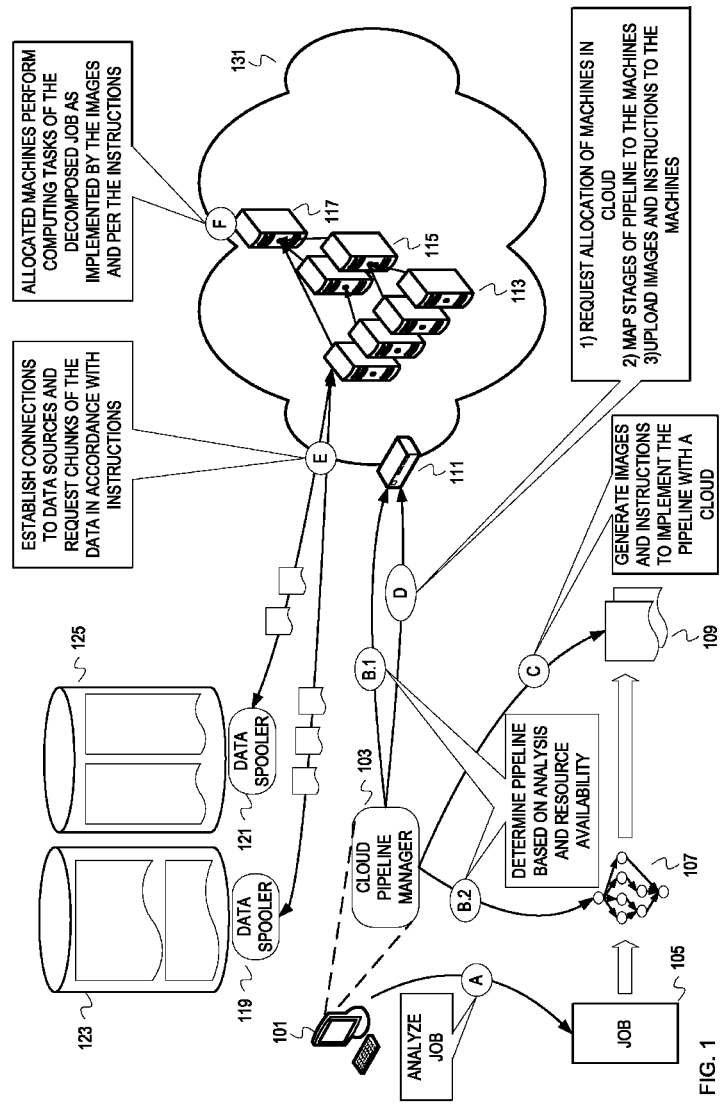
FIG. 1 depicts a conceptual diagram of deploying a decomposed processing job to machines allocated from a cloud.

The description that follows includes exemplary systems, methods, techniques, instruction sequences and computer program products that embody techniques of the present inventive subject matter. However, it is understood that the described embodiments may be practiced without these specific details. For instance, although examples refer to a cloud pipeline within a single cloud, a cloud pipeline can span multiple clouds. In other instances, well-known instruction instances, protocols, structures and techniques have not been shown in detail in order not to obfuscate the description.

A resource intensive data processing job (e.g., processing job on one or more data sets than can exceed multiple terabytes) can be broken or decomposed into processing sub-units ("computing tasks") that operate upon less than the entire data set. Each of the computing tasks processes a chunk of the data set that is smaller than the data set ("data chunk"). The computing tasks that operate upon the data chunks can be deployed to a cloud in a pipelined manner to efficiently complete the resource intensive data processing job ("processing job"), while at the same time achieving the goal of transmitting the data from its point of origin and delivering the result of the processing to its eventual destination. Examples of computing tasks including sorting the data set, rearranging the data set, modifying the data set, deriving values from the data set, analysis of the data set, data mining, determining correlations, generating representations (e.g., graphs, charts, etc.) of analysis results, cloning the data set, comparative calculation or analysis of a data set and clone data set, etc. The processing job is analyzed to determine disparate computing tasks of the processing job, possible parallelism among the computing tasks, and dependencies among the computing tasks. For instance, a financial transaction review job involving several terabytes of financial transaction data can be decomposed into multiple computing tasks for organizing the data by account owners, transaction initiators, and grouping the transactions into ranges of monetary amounts for the transactions. The financial transaction review job is also broken into computing tasks to search for each of a variety of patterns. Different computing tasks can search based on different orderings or groupings of the financial transaction data performed by other computing tasks of the financial transaction review job. The computing tasks of the financial review job can also include generating a graphical depiction of the discovered patterns correlated with financial transactions that span multiple countries.

An application or tool can determine pipeline stages within a cloud(s) ("cloud pipeline") to perform the processing job based on the determined decomposition of the data processing job and on available/allocated resources from a cloud(s). The application dispatches the computing tasks in accordance with the determined stages of the cloud pipeline. The design of the cloud pipeline can incorporate various checkpoints and failover capacity. While the processing job executes in accordance with the cloud pipeline, which can span multiple days, one or more machines within the established cloud pipeline might fail. In the case of a failed machine in the cloud pipeline, the application can use the checkpoints and failover capacity to dynamically reschedule lost work and reroute remaining work to avoid the problem. Furthermore, the application may also acquire additional capacity to replace the lost capacity. Replacement of the lost capacity can involve generating new machine images. Embodiments can also re-task some of the remaining machines to perform a different role within the cloud pipeline as a result of the failure. Furthermore, functionality can be implemented to take into account currently deployed data processing jobs when planning/designing the cloud pipeline, and make modifications accordingly. The application can adjust one or both of the cloud pipeline plan and deployed jobs based on any one of state of the currently deployed jobs, a policy(ies) that is applied to an aggregation of all customer jobs, prioritization of the planned job against the deployed jobs, etc.

Where data is to be moved across corporate, national, governmental or other organizational boundaries the embodiments will ensure that the various legal, contractual and organizational rules and restrictions regarding data movement, security, processing and the trust of $3^{rd}$ parties will be complied with.

FIG. 1 depicts a conceptual diagram of deploying a decomposed processing job to machines allocated from a cloud. In FIG. 1, a machine 101 (e.g., terminal, computer, etc.) presents an interface to an application or tool 103 that designs a cloud pipeline for deploying a data processing job ("cloud pipeline manager"). The machine 101 may host an executing instance of the job to cloud pipeline manager 103 or present an interface to the job to cloud pipeline manager 103 executing on another device. The machine 101 is communicatively coupled with storage devices 123, 125. The machine 101 can manage the storage device 123, 125, or can communicate with another machine(s) that manages the storage devices 123, 125. Over several stages, the data processing job is dispatched to resources of a cloud 131 that are organized into a cloud pipeline.

At a stage A, a resource intensive data processing job is analyzed, resulting in a file 105. The file 105 describes or represents the data processing job in light of the analysis. The data processing job involves a large amount of data stored in the storage devices 123, 125 ("subject data"). The file 105 comprises data that can indicate a source of the subject data, destination(s) of the subject data, how to decompose the subject data, location(s) of any special code for processing the subject data, and rules or policies to apply to the job (e.g., budget, optimizations, etc.). The data processing job can be decomposed into disparate computing tasks to a level of granularity based on a specification or user defined parameter, which can vary based on the characteristics of the data processing job. The disparate computing tasks can be based on any one of functionality, inputs and outputs ("dependencies" or "processing flow"), processing time, separation of the subject data into chunks based on the processing flow or dependencies, etc. Embodiments can generate data (e.g., a file) that indicates or represents the disparate computing tasks and/or which chunks of data (e.g., addresses and size) are operated upon and when (e.g., with respect to time, with respect to particular operations, with respect to processing of other data chunks, etc.).

At stage B, the cloud pipeline manager 103 determines a cloud pipeline based on the analysis as represented by data of the file 105, as well as availability of resources from one or more cloud service providers. The cloud service providers are selected from a list of cloud service providers the customer is willing for the application to approach, and provides the metadata necessary for it to make decisions about whether or not it is allowed to use that cloud service provider for this particular job and, if so, what restrictions apply to that usage. The metadata provided for cloud service providers can include elements such as country where the cloud is located, owning organization, contractual restrictions, level of trust, preference of usage, etc. The list of cloud service providers can be indicated in a variety of ways (e.g., in a data file accessible by the machine 101, downloaded from a corporate site, supplied as a response to a query to a service or online applications that accesses a repository of cloud service providers, etc.). Assuming the candidate cloud service providers are indicated in a data file ("cloud candidate file"), this file also includes the metadata about the cloud service providers. The metadata indicates information about the owner of a cloud service provider, such as nationality. The metadata may also indicate information about countries, such as what data can and cannot be sent there and what processing can and cannot occur there. This metadata is married with the metadata describing the job (from file 105), which could include country of origin, contractual restrictions, a data classification, a data security level, and the nature of the processing steps required. For example, if a job requires a strong decryption step, there would be a note to this effect in the job file (105). The cloud candidate file would have a note that strong encryption and decryption processing may not be performed upon any machines located in France, so this would rule out any clouds that were located in France as candidates for performing this decryption step. For a second example, if the candidate file said there was a low level of trust of an owning organization, then it may still be possible to use their systems for processing non-sensitive data, but possibly subject to restrictions that the data is sent in and out under heavy encryption and is never decrypted to disk.

FIG. 1 depicts stage B as B.1 and B.2. In addition to designing a cloud pipeline and deploying a data processing job to the cloud pipeline, the cloud pipeline manager 103 comprises functionality for monitoring and managing deployed processing jobs. Embodiments can implement each of these responsibilities in different applications or tools, which can communicate with each other. FIG. 1, though, assumes that the cloud pipeline manager 103 comprises the functionality for monitoring and managing deployed jobs. At stage B.1, the cloud pipeline manager 103 submits inquiries to cloud service providers about the availability of computing resources within a time constraint defined for the job (or in general for the customer) to process the subject data. Although FIG. 1 only depicts a single cloud service provider 131, the cloud pipeline manager 103 more likely contacts several cloud service providers. The cloud pipeline manager 103 acquires preliminary resource availability estimates from the cloud service providers. At stage B.2, the cloud pipeline manager 103 uses the data from the job file 105 and the preliminary resource availability estimates to generate a plan or design 107 for performing the data processing job in stages with the available cloud computing resources that satisfy job constraints. This avoids cumbersome delivery of all of the data for the processing job at once or beforehand, and allows for more flexible adaptation of the design to the available resources. As with the decomposition, the cloud pipeline plan 107 can be constrained to a specification(s) or parameter(s). The cloud pipeline manager 103 will take into account the availability of cloud resources, the availability of overall budget for the data processing job (and possibly other processing jobs of the client), the impact upon (and, if necessary, the replanning) of jobs that are already running, and any legal considerations upon data movement and processing. The preliminary estimates of resource availability can be provided from the cloud service providers as additional data files (not shown in the figure). The additional data files can also indicate whether other job criteria or constraints are satisfied, which may be indicated for the data processing job or for a client. The other job criteria can comprise subjective restrictions (e.g., encryption requirements), and legal restrictions (e.g., limitations of cloud service providers based on jurisdictions and/or location of one or both of the data and the customer) similar to the data discussed above with reference to the cloud candidate file.

For example, the cloud pipeline plan 107 can be generated with the constraint of maximum time to completion, maximum budget for the data processing job, redundant operations for result validation, etc. The pipeline design 107 indicates the applications corresponding to the computing tasks (i.e., the applications that will perform the computing tasks), data sources, and data chunks. In this illustration, the data sources are the storage devices 123, 125. The correspondence between applications and computing tasks are not necessarily one to one. For the decomposing or pipeline designing, computing tasks can be grouped together for efficiency or based on available applications. For instance, a data processing job can identify various applications for performing the data processing job. Instead of decomposing the job to an atomic level of computing tasks, the job can be decomposed based on functionality of the applications and possible parallelism. In FIG. 1, the cloud pipeline plan 107 includes a node that represents an initiation of the cloud pipeline, and three subsequent stages. In a first cloud pipeline stage, four nodes represent four computing tasks and/or applications performed in parallel. A second cloud pipeline stage includes two nodes that represent two computing tasks or applications executing in parallel. A first of the second stage nodes receives output from two of the first stage nodes as input. A second of the second stage nodes receives output from the third first stage node as input. The third and final cloud pipeline stage includes a single node. The cloud pipeline plan 107 indicates that the third stage node receives input from the second stage nodes and the fourth first stage node. Each of the nodes is associated with information that identifies data chunks from the data in the storage devices 123, 125. The information can be embedded within the cloud pipeline plan 107, referred to from the cloud pipeline plan 107, indicated in a separate file indexed by values that correspond to nodes of the cloud pipeline plan 107, etc.

Embodiments can also release resources held by deployed jobs to provide additional resources for the execution of the planned job. This would entail a round of negotiation between the application monitoring and managing the deployed jobs and the various cloud service providers available. The cloud service providers may competitively bid against each other responsive to the inquiry from the application designing the cloud pipeline and managing the deployed jobs. Eventually, the application would either settle on a configuration of cloud services to execute the job or conclude that the job cannot be processed within the requested parameters—even if deployed jobs are delayed or cancelled.

After the cloud pipeline manager 103 designs a cloud pipeline based on the analysis and the estimates of resource availability, the results are presented to a user or saved to memory/storage. The results will give an expected completion time, and any changes to the expected completion times of currently deployed jobs whose schedules have to be adjusted to accommodate the new job. The user is then able to accept or reject this plan. If they accept it, then the processing proceeds as below. If they reject it, processing stops. But the user is free to modify the parameters in the job file and then resubmit it to see if they can get a more acceptable plan. The cloud pipeline manager 103 may also arrive at results that indicate the new job cannot be done based on the analysis, constraints, and available computing resources. A user can also modify the job file in an attempt to deploy the job.

At stage C, the job to cloud pipeline manager 103 generates software images (e.g., ISO images, disk images, boot images) and executable/interpretable instructions 109 to implement the pipeline design 107 with resources allocated from a cloud computing service provider. The software images 109 comprise a complete operating system that is compatible with the cloud environment provided, the code enabling the machine to participate in the pipeline, a directory structure with files for performing one or more computing tasks as identified by job file 105 and one or more authentication tokens. The software images 109 can comprise multiple instances of a same software image, software images that employ the same tool or application but operate upon different data chunks, etc. The instructions 109 can comprise instructions for execution of the images, for connecting to data sources, for decrypting images, for establishing secure connections, for reporting progress, for recovery or load balancing, etc. Embodiments can bundle the instructions 109 together for an initial deployment, or successively send different sets of the instructions 109 in accordance with the cloud pipeline. For instance, an initial set of the instructions 109 can indicate a process for a first group of machines to establish secure connections for transmitting data. A second set of the instructions 109 can indicate images or instructions to be fetched by the group of machines. A third set of instructions can indicate when a second group is to establish secure connections and fetch a fourth set of instructions, which indicate processing to be performed by the second group of machines.

At stage D, the job to cloud pipeline manager 103 performs several operations based on resource allocation from a cloud computing service provider 131. The cloud pipeline manager 103 requests allocation of the resources from the cloud computing service provider 131 that were indicated as available responsive the query of stage B.1. Examples of resources include machines (virtual and/or physical), memory/storage, backup resources, etc. In FIG. 1, the cloud pipeline manager 103 submits the request to a cloud managing device 111. The cloud managing device 111 allocates the resources to the cloud pipeline manager 103 (or entity associated with the cloud pipeline manager 103). The cloud pipeline manager 103 maps stages of the pipeline design 107 to the allocated machines. In FIG. 1, the cloud computing service provider 131 allocates seven machines in accordance with the cloud pipeline plan 107: first stage machines 113, second stage machines 115, and third stage machines 117. After mapping, the cloud pipeline manager 103 uploads the images and instructions to the machines after additional information is exchanged with the cloud computing service provider 131 (e.g., service agreement confirmation, credential exchange, information to access the allocated resources, etc.). Embodiments can perform additional operations to validate the resource allocation and/or pipeline design before actually committing to executing processing job as defined by the pipeline design 107.

At stage E, the allocated machines of the cloud computing service provider 131 establish connections to data sources and request data chunks in accordance with the uploaded instructions. The uploaded images may also comprise instructions for establishing connections and requesting data chunks. FIG. 1 depicts the first stage cloud pipeline machines 113 establishing connections with data spoolers 119, 121. The data spooler 119 spools data from the storage device 123, and the data spooler 121 spools data from the storage device 125. In accordance with the requests, the data spoolers 119, 121 send data chunks for the first stage to the machines 113. In some embodiments, the data spoolers may be cloud machines that are physically adjacent to the storage devices managed by their own cloud server provider. The spoolers would be acquired from this cloud service provider as would the other machines in the pipeline. Typically the first stage in the pipeline will be a 'READ' stage that pulls the data in. The spooler will also perform compression and encryption of the data if required.

At stage F, the allocated machines 113, 115, 117 perform the computing tasks of the decomposed data processing job as implemented by the uploaded images and pursuant to the uploaded instructions. An image can comprise files and structure for one or more applications, as well as instructions for passing data among the applications or to other machines. The instructions can run an application, terminate the application, and run another application. A result(s) generated from the cloud pipeline is packaged (e.g., compressed, encrypted, formatted, wrapped in additional code and/or data, etc.) and transmitted to a destination specified by the uploaded instructions. The destination can also be predefined by agreement, received during the run of the data processing job, etc. While the job is being performed, each of the allocated machines reports status or progress back to the cloud pipeline manager 103. Embodiments can designate a single machine to collect status from allocated machines and report back to the cloud pipeline manager 103.

Although the example of FIG. 1 depicts stages spanning across machines, the stages of a cloud pipeline may be defined by stages of data chunk delivery. For example, the three stages of the cloud pipeline plan 107 can represent a timeline for data chunk delivery. Data chunks for a first cloud pipeline stage can be delivered in a burst or over time. While the first stage of data chunks are being processed, transmission of the second stage of data chunks can begin. For example, the machines can request delivery of the data chunks for the second stage to begin. Concerns of bandwidth can be relaxed because the second stage of data chunks will not be operated upon until processing of the first stage of data chunks completes. The cloud pipeline plan 107 can actually reuse the first stage machines to perform processing of data chunks requested while a second stage of data chunks are being operated upon. In other words, the second stage machines 115 can begin processing data chunks received while the first stage machine 113 were processing the first stage data chunk. And then the first stage machines 113 can request a next set of data chunks for processing to be performed by the first stage machines 113, essentially making the machines 113 both first and third stage machines.

FIG. 1 depicts an example embodiment that designs a cloud pipeline, and then adjusts the cloud pipeline based on resource availability. Embodiments can determine available resources from cloud service providers that best meet job constraints, and then design the cloud pipeline based on the selected one (or more) cloud service providers to handle the processing job.

Figure 2A:
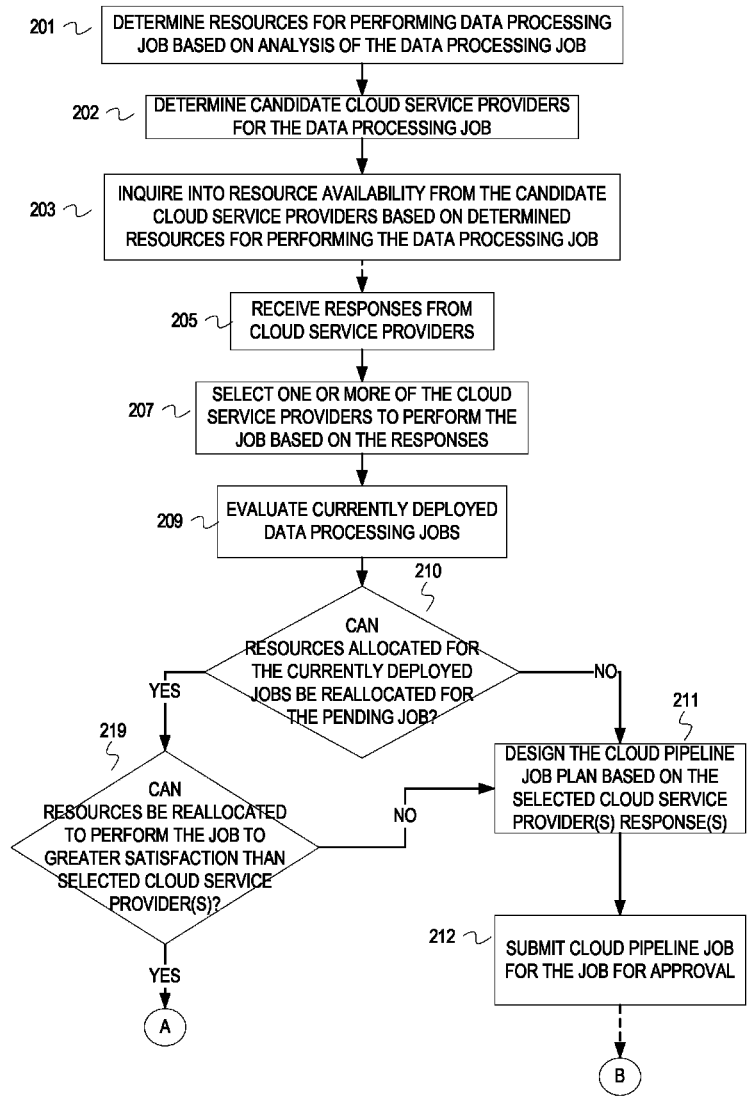
FIGS. 2A-2B depict a flowchart of example operations for designing a cloud pipeline and deploying a data processing job to the cloud pipeline.
Figure 2B:
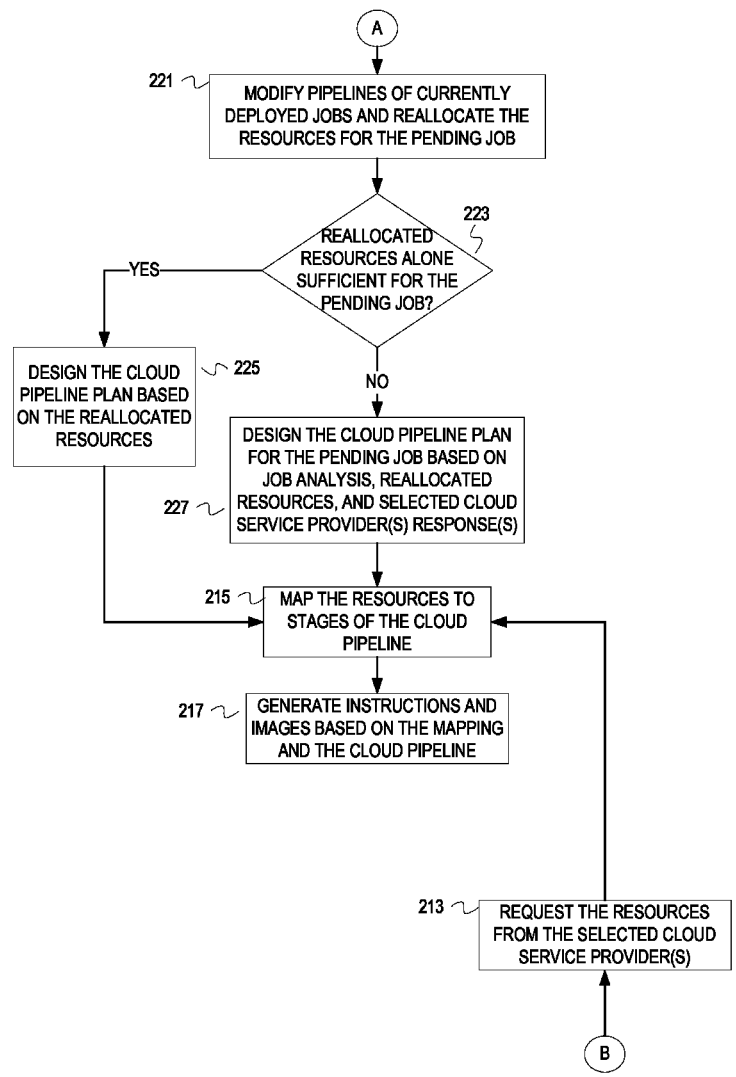

FIGS. 2A-2B depict a flowchart of example operations for designing a cloud pipeline and deploying a data processing job to the cloud pipeline. As previously discussed, a resource intensive data processing job is analyzed to determine how to decompose the data processing job, perhaps in more than one way. The analysis can take into account disparate computing tasks of the job, dependencies among computing tasks, location of data sets, possible parallelism, flow of operations, etc. The disparate computing tasks can be based on functional granularity, application granularity, connection granularity, etc. The dependencies among the computing tasks can be determined based on inputs and outputs of functions or applications. For instance, a function(s) or application(s) may provide data as input to another function(s) or application(s). An application or function may already have a data chunk from the data source, but also operate upon output from another function or application. Parallelism takes into account the dependencies, but also access to the data source. For example, locks or semaphores may be limited or not used, thus impacting accessing of the data source and possible parallelism in the cloud pipeline. The analysis can also be based on specifications or parameters for the data processing job. The analysis is also influenced by constraints and/or policies that govern the data processing job.

Based on the analysis data, resources are determined for performing the data processing job at block 201 of FIG. 2A. The application may determine an amount of storage needed at given times of the job, determine allocation of processing power for various ones of the disparate computing tasks in order to satisfy a time constraint and/or budget constraint, etc.

At block 202, candidate cloud service providers for the data processing job are determined. For instance, a cloud manager evaluates metadata from the job analysis against metadata about cloud service providers acceptable to the customer. The cloud service providers that do not satisfy criteria indicated in the job analysis metadata can be eliminated based on the metadata about the cloud service providers. In addition, the cloud manager can establish a preferential usage order among the remaining cloud service providers based on the analysis metadata and the cloud service provider metadata.

At block 203, resource availability from the candidate cloud service providers is inquired into based on the resources determined for performing the data processing job. For example, a cloud pipeline manager sends data that indicates desired resources, optional resources, scheduling, etc.

At block 205, responses to the inquiries are received from the cloud service providers. Responses can indicate resources that could be allocated, how long the resources could be allocated, level of processing power, etc. The responses are not necessarily limited to cloud service providers that can satisfy all criteria for the job, and a lack of responses from those that cannot perform the job. Cloud service providers that can partially perform the data processing job can also provide responses, in case the customer allows for aggregation of resources across different cloud service providers.

At block 207, one or more of the cloud service providers that responded are selected to perform the data processing job based on the responses. For example, a cloud pipeline manager stores the responses of the selected cloud services providers.

At block 209, currently deployed data processing jobs are evaluated. For instance, a cloud pipeline manager can determine status of currently deployed jobs, progress of the currently deployed jobs, constraints of the currently deployed jobs, and resources allocated to the currently deployed jobs. The cloud pipeline manager can maintain a data structure(s) that tracks the jobs deployed by the cloud pipeline manager. When a job is first deployed, the cloud pipeline manager can record the resources allocated to the job, the cloud service providers handling the job, and constraints of the job. The cloud pipeline manager can update the data structure(s) with status and/or progress of the job based on reports received from the machines performing the data processing job.

At block 210, it is determined if the resources allocated for the currently deployed job can be reallocated for the pending job. Reallocation of resources can be based on various factors. Resources may be reallocated from a job because the job is ahead of schedule, for instance. Resources may be allocated because the pending job has a higher priority than a currently deployed job, and a maximum time to completion constraint will still be with remaining resources for the deployed job. If the resources can be reallocated without violating constraints of the deployed job or violating a quality of service or policy for the customer, then control flows to block 219. Otherwise control flows to block 211.

At block 211, the cloud pipeline plan is designed based on the resources available for the data process job from the selected cloud service providers. For example, cloud pipeline manager can determine stages for varying degrees of parallelism and accommodate various dependencies based on the available resources.

At block 212, the cloud pipeline plan is submitted for approval. For instance, a depiction of the cloud pipeline plan for the job is presented in a user interface. If the cloud pipeline plan is approved, then the job proceeds in accordance with the cloud pipeline plan.

At block 213, the resources are requested from the selected cloud service provider(s). Although resources are available, the control of or access to the resources may not be permitted until one or more confirmation process steps are performed to ensure, for example, the requesting customer is prepared to pay for the cloud resources to be allocated. Standing agreements with a cloud computing service provider can obviate confirmation measures.

At block 215, the resources are mapped to stages of the cloud pipeline. Referring to the cloud pipeline plan 107, a machine from the cloud is associated with a node of each stage. The association may associate a generic machine identifier (e.g., 1 of 7 machines), or, if known, a particular machine identifier. A generic machine identifier can be replaced later by a particular machine identifier generated, perhaps for tracking and/or billing purposes, for an instantiated virtual machine.

At block 217, instructions and images are generated based on the mapping and the cloud pipeline. Instructions for establishing connections, running particular applications, establishing security measures, etc., are generated. The instructions specify credentials to be obtained for accessing a data source or portions of the data source. The instruction can specify how to decrypt the images that accompany the instructions. The instructions can also tear down processes/applications to instantiate new processes/application on a cloud machine, as well as when to request data chunks or a next set of instructions. The instructions can also implement monitoring and reporting functions. For example, the instructions can cause a cloud machine to report when a function or stage has completed. The instructions can cause a cloud machine to generate progress report messages at given intervals, report if transmission rates fall below a threshold or if bandwidth availability increases.

If it was determined that resources could be reallocated from currently deployed jobs at block 219, then it is determined if the resources to be reallocated would perform the job to a greater satisfaction than the resources available from the selected cloud service provider(s). Reallocated resources could be aggregated with the resources of the selected service provider(s) to perform a job more quickly, or provide greater redundancy and validation. Perhaps, the resources from the currently deployed job have better specifications than the available resources. If the resources to be reallocated can be used to perform the job to a greater degree of satisfaction, then control flows to block 221 of FIG. 2B. Otherwise, control flows to block 211, and the resources are not reallocated.

FIG. 2B depicts example operations that continue from FIG. 2A. At block 221, the cloud pipeline(s) of the currently deployed job(s) is modified in light of the reallocation, and the resources of the currently pending job are reallocated to the pending job.

At block 223, it is determined if the reallocated resources alone are sufficient for the pending job. For example, it may be determined that the reallocated resources could perform the job at slower rate, but at a lower cost. If the pending job constraints are still satisfied with the slower rate of operations and the customer prioritizes lowest cost, then the reallocated resources can be used to perform the job instead of more expensive resources. If the reallocated resources alone are sufficient for the pending job, then control flows to block 225. Otherwise, control flows to block 227.

At block 225, the cloud pipeline is designed based on the reallocated resources. Control flows from block 225 to block 215.

At block 227, the cloud pipeline is designed for the pending job based on the job analysis, the reallocated resources, and the response(s) of the selected cloud service provider(s). Control flows from block 227 to block 215 of FIG. 2A.

Figure 3:
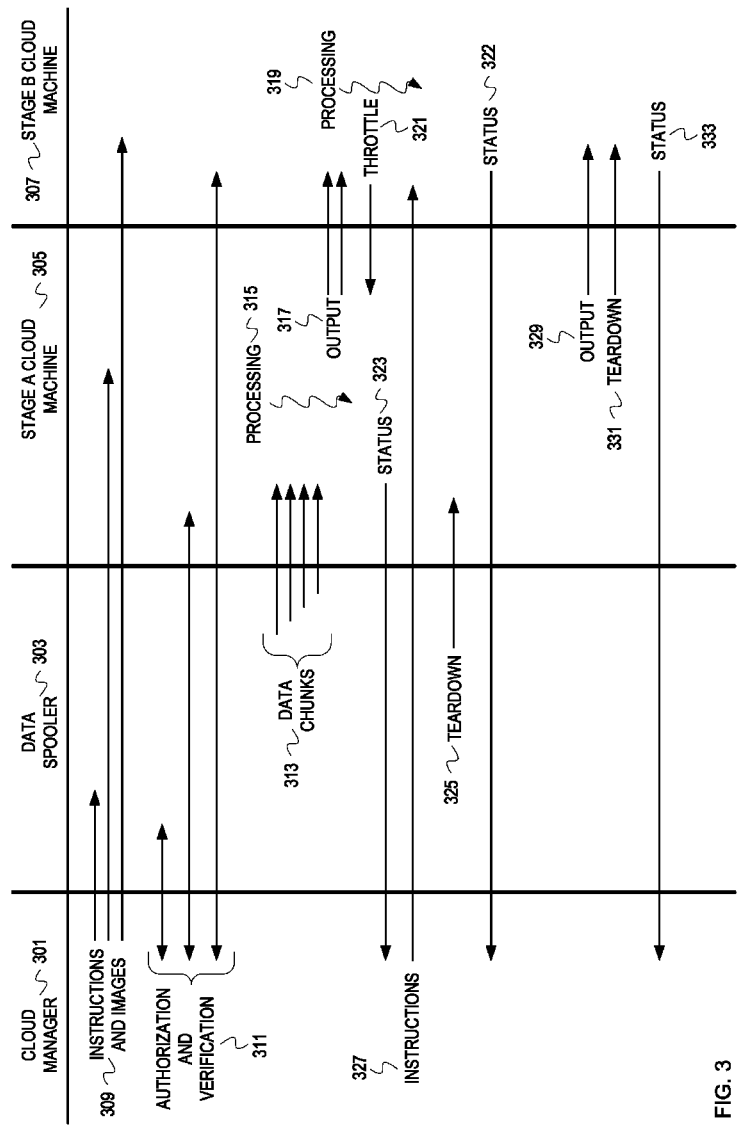
FIG. 3 depicts example communication to coordinate elements of a cloud pipeline performing a data processing job.

FIG. 3 depicts example communication to coordinate elements of a cloud pipeline performing a data processing job. The depicted entities include a cloud manager 301, a data spooler 303, a stage A cloud machine 305, and a stage B cloud machine 307. FIG. 3 is limited to this simpler illustration to aid in understanding the inventive subject matter and to avoid unnecessary complexity that can arise. A cloud pipeline can be comprise any number of data sources/spoolers, be established across any number of cloud service providers, can involve any number of cloud machines, and have any number of cloud pipeline stages. The depicted example illustrates possible message exchanges among these few entities. Data processing can continue beyond the stage B cloud machine 307 or end at the stage B cloud machine 307. In addition, the example may also have other cloud machines and/or data spoolers running in parallel to those depicted in the Figure. Furthermore, the data processing job can begin even thought the cloud pipeline is not completely constructed or established. Additional cloud machines and/or stages can be added to the cloud pipeline while the data processing job is running Data spoolers may take several days to spool the first chunks of data to the first stage machines and several more days for the first stage machine to process the first data chunks. The cloud pipeline can be constructed using Just in Time principles, where the machines for stage n+1 are deployed only hours or minutes before the machines in stage n are ready to start sending them data. Likewise, with teardown, once the spoolers have finished sending all of the data, they can be freed, subject to the jobs recovery settings. The job recovery settings or instructions for job recovery can indicate that at least some of the spoolers should remain online or active for the data processing job in case of a failure in the cloud pipeline to allow for recovery. Recovery settings are not limited to holding spoolers for recovery. Recovery settings can range from delaying release of a resource (e.g., a machine, storage, or spooler) to coordinating several machines across multiple cloud service providers in different data processing jobs to assume responsibilities of failed machines, maintain consistency of data, redundancy, etc. The progressive release of resources with job progress and just in time allocation of resources reduces the overall cost of running the pipeline, without impacting on its performance. The contracts for just in time or later deployed machines may not be firmed up until shortly before they are needed—at which time the cloud pipeline manager may be able to get a better deal on providing the resources it needs.

The cloud manager sends images and/or instructions 309 to the data spooler 303, the stage A cloud machine 305, and the stage B cloud machine 307. The images comprise file and folder for applications to perform the data processing. The instructions comprise code for establishing connections, authentication and verification, supplying health messages and/or periodic status reports, etc. The images and instructions can be sent as separate files, as a package, or the images can include the instructions.

In accordance with the instructions, authorization and verification are performed to ensure security of the cloud pipeline (311). Each of the data spooler 303, stage A cloud machine 305, and the stage B cloud machine 307 will contact the cloud manager 301 to authorize the machines and verify authenticity of the images. This is to detect attempts to substitute an untrusted machine or to modify the image a trusted machine is loaded from to make it hostile. The data spoolers are not authorized to send any data to a machine until it has authenticated itself and verified its image. An example image verification can involve the calculation of a series of checksum values. Another example could be the inclusion of a one time pad for encrypted communication. The cloud manager 301 will indicate to the data spooler 303 the authorized and verified cloud machines.

After the security measures are satisfied, the data spooler 303 begins sending data chunks 313 to the stage A cloud machine. After the authorization process, the machines in the cloud pipeline establish connections. The cloud machines will connect to the machines that are up and downstream from them in the pipeline. As machines connect to the spoolers, they will start sending data chunks out to them. This transmission is controlled by the spoolers. Hence, the data spooler 303 controls transmission of the data chunks 313 to the stage A cloud machine after the stage A cloud machine 305 connects to the data spooler 303.

The stage A cloud machine 305 begins processing (315) the data chunks 313 received from the data spooler 303. As part of the operations, the stage A cloud machine 305 begins transmitting output 317 to the stage B cloud machine 307, which previously connected to the stage A cloud machine after being authorized and its image verified. The stage B cloud machine 307 begins processing (319) the output 317 from the stage A cloud machine 305.

While the machines of the cloud pipeline work on the data processing jobs, various messages can be exchanged among the machines and with the cloud pipeline manager. A cloud pipeline message can request an increase in data transmission rate, decrease in data transmission rate, indicate completion of the job, indicate arrival of data chunks, indicate completion of a step or stage, indicate transmission of data, etc. The cloud pipeline message can also indicate health of the machines in the cloud pipeline (e.g., heartbeat messages, exception messages from machines to say they've lost contact with upstream or downstream machines, etc.). As the data processing job progresses through the cloud pipeline, additional requests for data may be generated. In addition, changes in resource availability (e.g., bandwidth decrease, machine failure, etc.) can trigger generation of a message to throttle down a current data transmission. In FIG. 3, the stage A cloud machine 305 transmits a status message 323 to the cloud manager 301. The status message can indicate a particular operation being performed or percentage completion of the tasks assigned to stage A. FIG. 3 also depicts the stage B cloud machine 307 transmits a throttle message 321 to the stage A cloud machine 305. A throttle message can be sent responsive to predicting or determining that the output from the stage A cloud machine 305 will overwhelm receive buffers of the stage B cloud machine 307, for example. In response, the stage A cloud machine 305 reduces the transmission rate of the output to the stage B cloud machine 307.

The cloud manager 301 transmits instructions 327 to the stage B cloud machine 307. The instructions 307 transmitted during the data processing job can add to the computing tasks assigned to the stage B cloud machine, change a credential to be used by the stage B cloud machine, modify a computing task, instruct the stage B cloud machine 307 to assume the responsibilities of a machine that has failed, etc. In one example, the instructions 327 implement a recovery plan after the cloud manager 301 detects a failure in the cloud pipeline. The failure could be a failure to satisfy a job criterion or a failure of the machine (e.g., the machine 305 crashes). For example, assume the stage A cloud machine 305 fails. The stage A cloud machine 305 could communicate the failure in the status message 323 (e.g., change in processing speed, a message value is incorrect, etc.). Or the cloud manager 301 could detect failing of the stage A cloud machine 305 through a timeout mechanism. For instance, the stage A cloud machine 305 fails to transmit a heartbeat message. The cloud manager adapts the cloud pipeline to compensate for the failure with the recovery plan. The recovery plan may be to delay teardown of the data spooler 303 until the stage A cloud machine 305 finishes transmitting output to the stage B cloud machine 307. In the case of a failure, the recovery plan can shift processing responsibilities of the failed machine, in this example the stage A cloud machine 305, to a different machine (e.g., a machine from a preceding stage, a machine from a later stage, a machine that would be new to the cloud pipeline, or a machine from a different cloud pipeline). A particular implementation of a recovery plan may vary depending on the extent of the failure. And the recovery plan may be implemented by more than instructions for execution transmitted to retask machines. Instructions to implement a recovery plan may establish or augment redundancy, retask several machines across different pipelines, temporarily throttle machines within the cloud pipeline, temporarily acquire cloud pipeline resources (e.g., new servers, disk space, etc.), etc. The cloud manager 301 will also adapt to restoration of resources. For example, the stage A cloud machine 305 may be restored and send a communication to the cloud manager 301 to that effect. The cloud manager 305 may then allow the machine 305 to resume completion of the stage A computing tasks assigned to it.

The data spooler 303 runs out of data to send, and sends out a teardown message 325 to the stage A cloud machine 305.

This teardown message 325 signals to the stage A cloud machine 305 that it should shutdown after finishing processing of the last data chunks sent by the data spooler 303.

The stage B cloud machine 307 transmits a status message 322 to the cloud manager 301. The status message 322 can indicate any one or more of that the stage B cloud machine is still processing, a percentage or stage of completion, and expected remaining time to completion.

The stage A cloud machine 305 complete processing and sends the last output 329 to the stage B cloud machine 307. The stage A cloud machine 305 sends a terminate message 331 to the stage B cloud machine 307, and then shuts down from the cloud pipeline. The stage B cloud machine 307 sends another status message 333 to the cloud manager 301. This status message 333 can convey that the stage A operations have completed, as well as progress of the stage B operations.

In another embodiment, it is possible to hold the pipeline open when the source has run out of data. This means that any data subsequently added to the source will be transmitted into the pipeline as soon as it arrives. In this situation, the termination of the pipeline is manually requested through the cloud manager 301.

The flows depicted in FIGS. 2A-2B and 3 are intended to aid in understanding the inventive subject matter and should not be used to limit the embodiments or claim scope. Embodiments can performed operations in a different order, in parallel, perform additional operations, and/or perform fewer operations. For example, referring to FIG. 2, additional operations can be performed to take into account constraints and/or job specification(s) when designing the cloud pipeline. Further, additional operations can be performed to aggregate resources across different clouds. Moreover, embodiments do not necessarily generates images as indicated in block 217 of FIG. 2. Embodiments can select already generated images. Embodiments can also modify selected images and copy images. Referring to FIG. 3, the operation depicted by block 301 and 303 can each be performed separately by different entities, as well as separate from the remainder of the blocks in FIG. 3. For example, an application that designs the cloud pipeline plan can spawn a process, thread, or daemon to listen and handle cloud pipeline messages.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
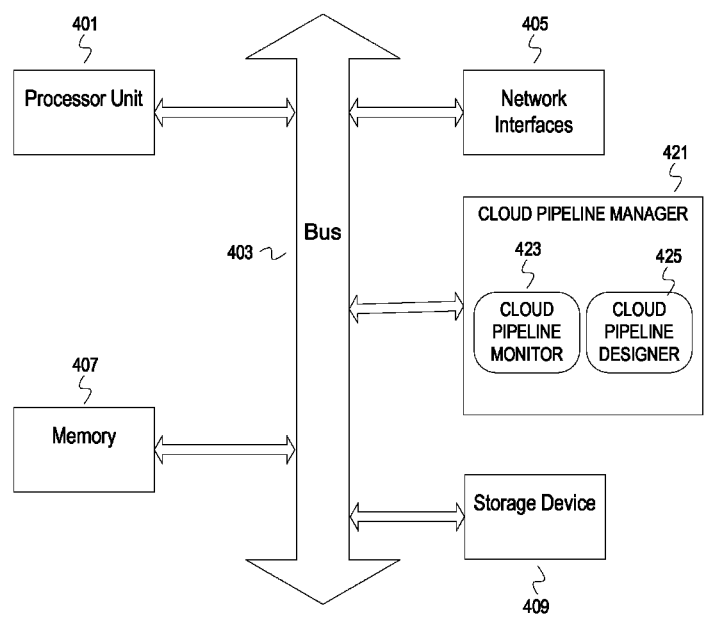
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The depicted system also includes a cloud pipeline manager 421 coupled with the bus 403. The cloud pipeline manager 421 is depicted as comprising a cloud pipeline monitor 423 and a cloud pipeline designer 425. The cloud pipeline designer evaluates available resources and other criteria of cloud computing resources against constraints of a job. The cloud pipeline designer 103 arranges the computing tasks of a job into stages based on the evaluation. The cloud pipeline monitor 423 monitors and manages a cloud pipeline as a data processing job progresses through the cloud pipeline. The cloud pipeline manager 421 can include monitoring progress of the job, status of the cloud pipeline machines, status of the data transmissions, etc. The cloud pipeline monitor 421 can also adapt the cloud pipeline to changes in resources. The cloud pipeline monitor can perform the functionalities described for the cloud pipeline manager 103 of FIG. 1 and the example cloud pipeline applications/processed discussed with reference to FIGS. 2 and 3. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for performing a resource intensive data processing job with a cloud pipeline as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
selecting a set of one or more cloud service providers to perform a data processing job based on information about the set of one or more cloud service providers and criteria of the data processing job;
designing a plan for a cloud pipeline for performing the data processing job, wherein said designing the plan for the cloud pipeline comprises
decomposing the data processing job into disparate computing tasks based, at least in part, on separation of a data set into data subsets for the data processing job and information about the set of one or more cloud service providers,
determining parallelism and dependencies among the disparate computing tasks;
determining a plurality of processing stages for performing the data processing job based, at least in part, on the determined parallelism and dependencies among the disparate computing tasks, wherein the plurality of processing stages constitute the cloud pipeline and wherein at least one of the plurality of processing stages includes multiple of the disparate computing tasks in parallel;
mapping allocated resources of the set of one or more cloud service providers to the plurality of processing stages;
generating instructions and software images based, at least in part, on the plan and said mapping of the allocated resources to the plurality of processing stages, wherein the instructions and the software images implement the cloud pipeline for performing the data processing job;
transmitting the instructions and the software images to machines of the set of one or more cloud service providers in accordance with the plurality of processing stages, wherein the allocated resources comprise the machines;
monitoring the machines and performing of the data processing job; and
if said monitoring detects a failure, then adapting the cloud pipeline to the failure.

2. The method of claim 1, wherein said adapting the cloud pipeline to the failure comprises at least one of:
transmitting second instructions to at least a first unaffected machine of the machines to retask the first unaffected machine;
communicating with the set of one or more cloud service providers to acquire a new machine and transmit third instructions to the new machine to incorporate the new machine into the cloud pipeline; and
delaying release of resources mapped to at least a first stage of the set of processing stages that precedes a second stage of the set of stages affected by the failure.

3. The method of claim 2 further comprising:
detecting recovery of a second machine mapped to the second stage; and
adapting the cloud pipeline to use the second machine.

4. The method of claim 1 further comprising:
determining resources for performing the data processing job;
determining candidate cloud service providers based, at least in part, on the resources for performing the data processing job; and inquiring into availability of the resources for performing the data processing job from the candidate cloud service providers, wherein the information about the set of one or more cloud service providers comprises responses to said inquiring into availability of the resources for performing the data processing job from the candidate cloud service providers, wherein the set of one or more cloud service providers are selected from the candidate cloud service providers.

5. The method of claim 4 further comprising identifying the candidate cloud service providers as cloud service providers that satisfy a set of one or more criteria for the data processing job.

6. The method of claim 1 further comprising:

determining that a second resource allocated for a currently deployed data processing job can be reallocated to the data processing job;

modifying a plan of the currently deployed data processing job to account for reallocating the second resource from the currently deployed data processing job to the data processing job; and reallocating the second resource to the data processing job, wherein said designing the plan for the cloud pipeline for performing the data processing job accounts for the second resource, wherein said mapping the resources of the set of one or more cloud service providers to the plurality of processing stages comprises mapping the second resource.

7. The method of claim 6 further comprising determining that reallocating the second resource to the data processing job will result in performing the data processing job to greater satisfaction than without the second resource.

8. The method of claim 1, wherein the information about the cloud service providers comprises at least one of an owning organization, nationality of the owning organization, security information, geographic location of hardware, and nationality of the owning organization.

9. The method of claim 1 further comprising submitting the plan for approval.

10. The method of claim 1 further comprising releasing a subset of the allocated resources prior to completion of the data processing job, wherein the subset of the allocated resources were mapped to a completed one of the plurality of processing stages.

11. The method of claim 10 further comprising:

authorizing the machines of the set of one or more cloud service providers; and verifying the instructions and software images transmitted to the machines.

12. The method of claim 11 further comprising transmitting at least one of additional instructions and additional software images to a newly allocated machine added to the cloud pipeline.

13. The method of claim 1 further comprising managing the allocated resources while the allocated resources perform the data processing job in accordance with the plan.

14. The method of claim 13 further comprising adapting the cloud pipeline to at least one of a change in resource availability, prioritization between the data processing job and another data processing job of a same client, and a policy that applies to the data processing job and another data processing job.

15. A computer program product for establishing a cloud pipeline for a data processing job, the computer program product comprising:

a computer readable storage medium having non-transitory computer readable program code embodied therewith, the computer readable program code comprising:

computer readable program code configured to design a plan for a cloud pipeline for performing the data processing job, wherein the computer readable program code configured to design the plan for the cloud pipeline comprises computer readable program code configured to, decompose the data processing job into disparate computing tasks based, at least in part, on separation of a data set into data subsets for the data processing job and information about the set of one or more cloud service providers, determine parallelism and dependencies among the disparate computing tasks, determine a plurality of processing stages for performing the data processing job based, at least in part, on determined parallelism and dependencies among the disparate computing tasks, wherein the plurality of processing stages constitute the cloud pipeline and wherein at least one of the plurality of processing stages includes multiple of the disparate computing tasks in parallel;

computer readable program code configured to map allocated resources of the set of one or more cloud service providers to the plurality of processing stages;

computer readable program code configured to generate instructions and software images based, at least in part, on the plan and mapping of the allocated resources to the plurality of processing stages, wherein the instructions and the software images implement the cloud pipeline for performing the data processing job;

computer readable program code configured to transmit the instructions and the software images to machines of the set of one or more cloud service providers in accordance with the plurality of processing stages, wherein the allocated resources comprise the machines;

computer readable program code configured to monitor the machines and the data processing job; and computer readable program code configured to adapt the cloud pipeline to a failure if the computer readable program code configured to monitor the machines and the data processing job detects a failure.

16. The computer program product of claim 15, wherein the computer readable program code configured to adapt the cloud pipeline to a failure comprises the computer readable program being configured to:

transmit second instructions to at least a first unaffected machine of the machines to retask the first unaffected machine;

communicate with the set of one or more cloud service providers to acquire a new machine and transmit third instructions to the new machine to incorporate the new machine into the cloud pipeline; or delay release of resources mapped to at least a first stage of the set of processing stages that precedes a second stage of the set of stages affected by the failure.

17. The computer program product of claim 15 further comprising:

computer readable program code configured to determine resources for performing the data processing job;

computer readable program code configured to determine candidate cloud service providers based, at least in part, on the resources for performing the data processing job; and computer readable program code configured to inquire into availability of the resources for performing the data processing job from the candidate cloud service providers, wherein the information about the set of one or more cloud service providers comprises responses to an inquiry into availability of the resources for performing the data processing job from the candidate cloud service providers, wherein the set of one or more cloud service providers are selected from the candidate cloud service providers.

18. The computer program product of claim 15 further comprising computer readable program code configured to identify the candidate cloud service providers as cloud service providers that satisfy a set of one or more criteria for the data processing job.

19. The computer program product of claim 15 further comprising:
  computer readable program code configured to determine that a second resource allocated for a currently deployed data processing job can be reallocated to the data processing job;
  computer readable program code configured to modify a plan of the currently deployed data processing job to account for reallocating the second resource from the currently deployed data processing job to the data processing job; and
  computer readable program code configured to reallocate the second resource to the data processing job,
  wherein said computer readable program code configured to design the plan for the cloud pipeline for performing the data processing job accounts for the second resource,
  wherein said computer readable program code configured to map the resources of the set of one or more cloud service providers to the plurality of processing stages comprises said computer readable program code configured to map the second resource.

20. The computer program product of claim 15 further comprising computer readable program code configured to release a subset of the allocated resources prior to completion of the data processing job, wherein the subset of the allocated resources were mapped to a completed one of the plurality of processing stages.

21. An apparatus comprising:
  a network interface;
  a processor; and
  a cloud pipeline manager operable to,
    design a plan for a cloud pipeline for performing the data processing job, wherein the cloud pipeline manager operable to design the plan for the cloud pipeline comprises the cloud pipeline manager being operable to,
      decompose the data processing job into disparate computing tasks based, at least in part, on separation of a data set into data subsets for the data processing job and information about the set of one or more cloud service providers,
      determine parallelism and dependencies among the disparate computing tasks,
      determine a plurality of processing stages for performing the data processing job based, at least in part, on determined parallelism and dependencies among the disparate computing tasks, wherein the plurality of processing stages constitute the cloud pipeline and wherein at least one of the plurality of processing stages includes multiple of the disparate computing tasks in parallel;
    map allocated resources of the set of one or more cloud service providers to the plurality of processing stages;
    generate instructions and software images based, at least in part, on the plan and mapping of the allocated resources to the plurality of processing stages, wherein the instructions and the software images implement the cloud pipeline for performing the data processing job;
    transmit the instructions and the software images to machines of the set of one or more cloud service providers in accordance with the plurality of processing stages, wherein the allocated resources comprise the machines;
    monitor the machines and the data processing job; and
    adapt the cloud pipeline to a failure if the computer readable program code configured to monitor the machines and the data processing job detects a failure.

22. The apparatus of claim 21, wherein the cloud pipeline manager is further operable to adapt the cloud pipeline to at least one of a change in resource availability from the set of one or more cloud service providers, a prioritization among a plurality of data processing jobs of a client that includes the data processing job, and a policy that governs the data processing job and an additional data processing job.

* * * * *